United States Patent [19]

Thorne

[11] 4,183,120
[45] Jan. 15, 1980

[54] ENCIRCLING DEVICES

[76] Inventor: George W. Thorne, 2625 Sea Island, Ft. Lauderdale, Fla. 33301

[21] Appl. No.: 907,712

[22] Filed: May 19, 1978

[51] Int. Cl.² ............... F16L 33/00; A44B 21/00
[52] U.S. Cl. ............... 24/16 R; 24/255 SL; 24/20 TT
[58] Field of Search ............... 24/20 TT, 255 SL

[56] References Cited

U.S. PATENT DOCUMENTS

| 712,765 | 11/1902 | Cole | 24/20 TT |
|---|---|---|---|
| 1,786,612 | 12/1930 | Heslop | 24/20 TT |
| 1,804,725 | 5/1931 | Walker | 24/20 TT |
| 2,033,592 | 3/1936 | Skeen | 24/20 TT |
| 3,229,998 | 1/1966 | Pennington | 24/255 SL |
| 3,602,953 | 9/1971 | Thomas | 24/20 TT |
| 3,809,371 | 5/1974 | Martini | 24/255 SL |
| 3,847,331 | 11/1974 | Vallinotto | 24/257 SL |
| 3,913,187 | 10/1975 | Okuda | 24/255 SL |
| 3,925,851 | 12/1975 | Bevans | 24/20 TT |

Primary Examiner—Bernard A. Gelak
Attorney, Agent, or Firm—Alfred H. Rosen

[57] ABSTRACT

Encircling clamps of a flexible elongated body fitted at a first end with a pair of parallel arms encircling a bay open at their extremities, and at the other end with a tongue that is insertable into the bay. One arm of the bay is a spring having restoring force when flexed away from the other arm, and ratchet teeth on its inner surface extending only part way from the opening to the interior of the bay. The tongue has mating ratchet teeth extending a longer distance so that when the tongue is inserted into the bay it can be adjustably positioned therein while engaging all the ratchet teeth of the spring arm. The closed device can be opened by lifting the spring arm away from the tongue. Means are provided to pull the tongue into the bay.

14 Claims, 11 Drawing Figures

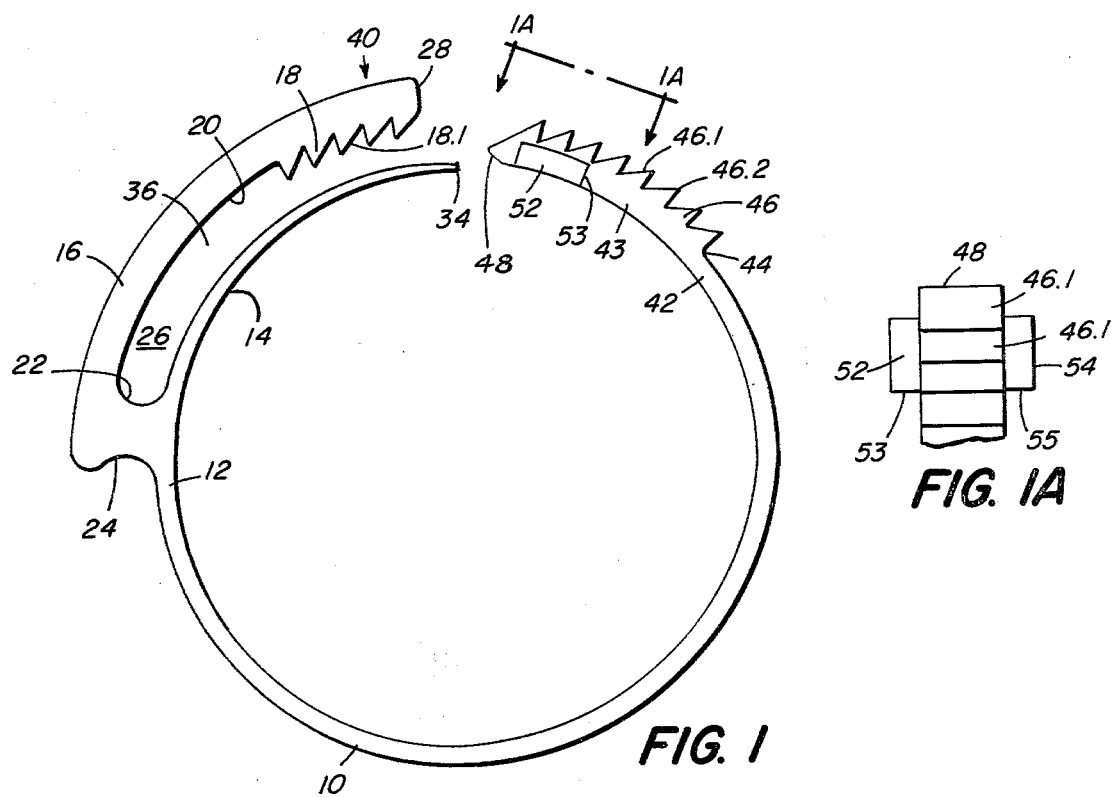
FIG. 1
FIG. 1A
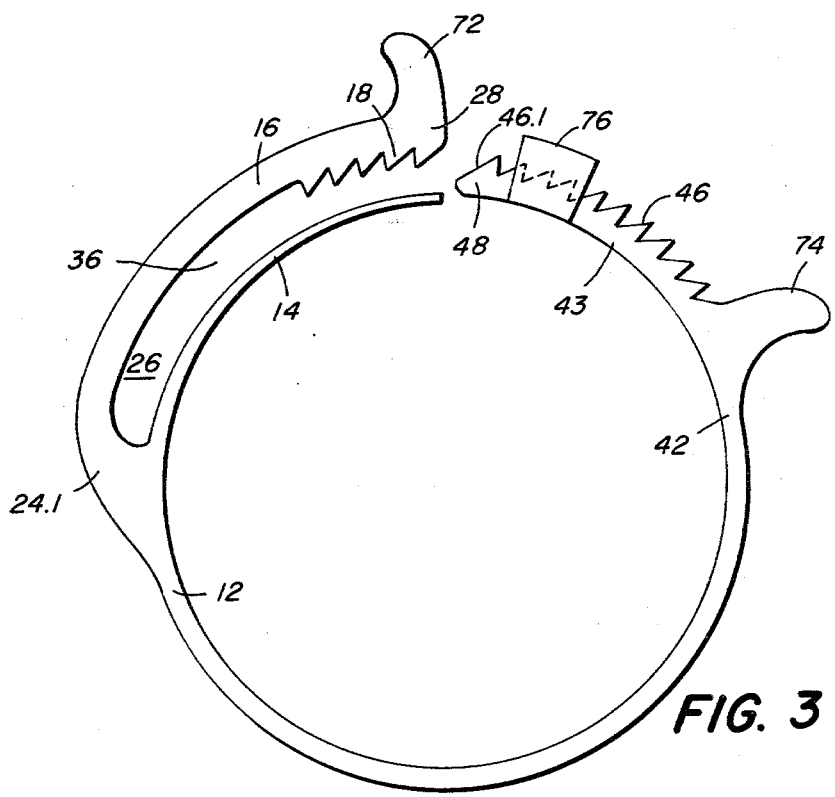
FIG. 3

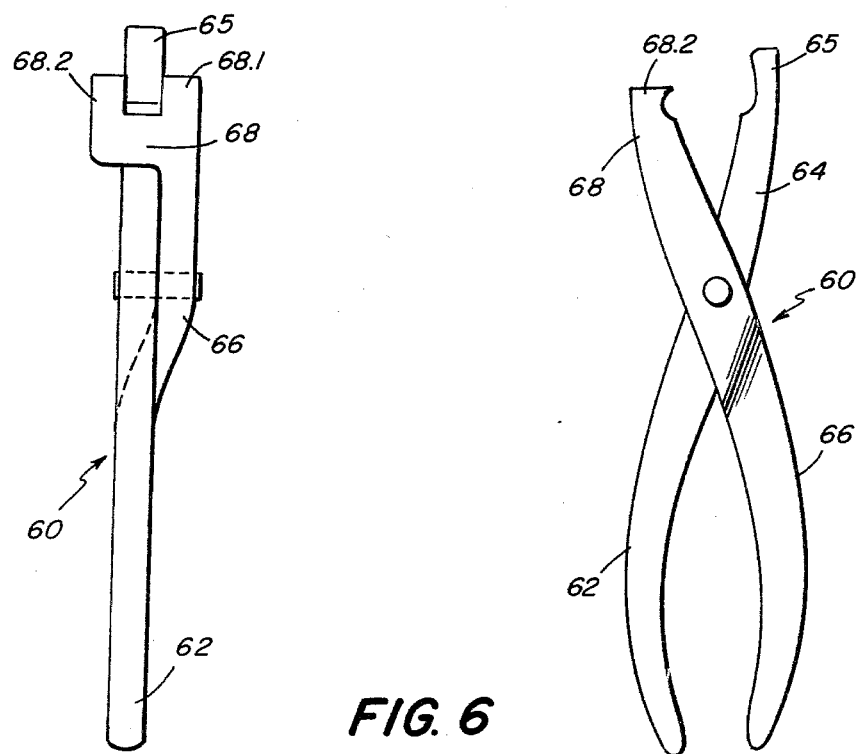
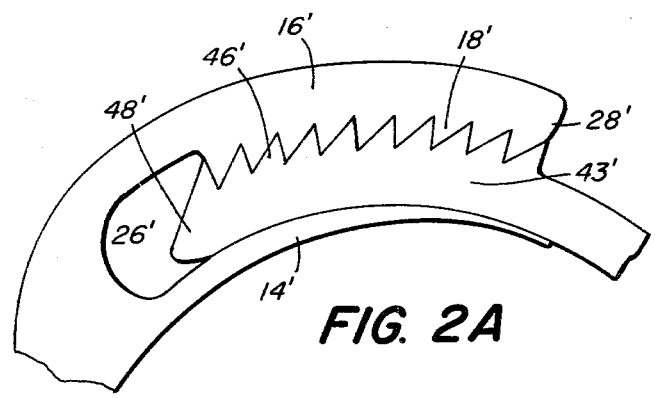
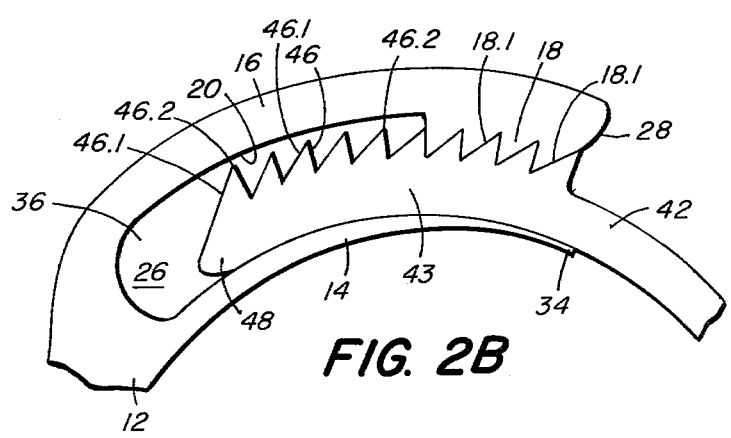

ENCIRCLING DEVICES

BACKGROUND OF THE INVENTION

Banding or encircling devices made of an elongated flexible band having ends fitted with adjustably interlockable means such that they can encircle a bundle of wires or clamp a hose on a pipe are available in a wide variety of forms and materials. This invention is concerned in general with banding and encircling devices made of plastics materials, preferably in one piece, and of a design that is suitable for production in large quantities and at low unit cost by a plastics-forming process such as molding. More particularly the invention relates to improvements which will enable such plastic devices to be used to clamp hoses on pipes with large clamping forces, to be installed reliably and quickly in mass-production operations such as automobile assembly, to be removed easily and quickly when and if necessary, without danger of destroying the device, and yet remain reliably in place until deliberately removed, and to be manufactured in large quantities and varieties of shapes and sizes, at low unit cost in a molding process.

Hose clamps made of plastic materials contribute to extending the life of an elastomeric hose clamped on a metal tube because, unlike a metal clamp, a plastic clamp can be made of a material that will expand and contract with the material of the hose, whereas metal clamps tend to bite into the hose. Yet, notwithstanding the desirability of making widespread use of plastic hose clamps, and the potential for supplying them in large quantities at low unit cost, existing designs have deficiencies which limit their use. Some such deficiencies are apparent in the examples of the prior art which follow.

THE PRIOR ART

Vallinotto et al, U.S. Pat. No. 3,605,200 shows a plastic hose clamp (1) with saw-tooth engagement teeth on confronting ends of a U-shaped flexible body. Each end is fitted with a non-toothed extension (8, 9) facing the toothed extension (4, 5) to form a bay for the toothed extension of the other end. Each toothed extension has teeth on substantially its entire length. To facilitate engagement of the teeth of one toothed extension with the teeth of the other toothed extension, each toothed extension is provided with a slot (12, 13), the immediate purpose of the slots being "the application of a greater degree of resilient deformation of the extensions". The clamp is closed (and the toothed extensions engaged with each other) by the application of compressive force on corrugations 14 at branches (2, 3) at the beginning of each extension (4, 5), so as to push the toothed extensions toward each other from their origins at the branches (2, 3). To remove the clamp from a tube-and-sleeve (10, 11) or the like, force is applied parallel to the longitudinal axis of the sleeve and tubular element, in respectively opposite directions on the two branches (2, 3), to disengage the toothed extensions (4, 5) from each other.

The clamp of Vallinotto et al. has inherent design defects which mitigate against its widespread adoption. The outermost non-toothed extension (8) forms with its confronting toothed extension (4) a bay into which the other toothed extension (5) must be forced when the clamp is fitted to a tube-and-sleeve combination (10, 11). Similarly, the innermost non-toothed extension (9) forms with its confronting toothed extension (5) a second bay into which the first-mentioned toothed extension (4) must be forced during fitting of the clamp to the tube-and-sleeve combination. This arrangement of two bays into each of which one of the toothed extensions must be forced to close the clamp around the tube-and-sleeve combination requires excessive force in closing the clamp in order to make each tooth of one toothed extension glide up and over successive teeth of the other toothed extension. As the clamp approaches its maximum closure position, increasing the number of teeth engaged between the two toothed extensions, more closing force is required. Bearing in mind that the force for closing this clamp is applied at the origin or root of each toothed extension, via the corrugations (14) on the branches (2, 3) from which the toothed extensions (4, 5) extend, it will be appreciated that one of the toothed extensions can easily be skewed in the axial direction relative to the other toothed extension as the respective free or outer ends of the toothed extensions are pushed deeper into their respective bays, resulting in a clamp that forms a helix rather than a ring around the tube-and-sleeve combination. This danger limits application of the Vallinotto et al clamp to light loads and applications where the risk of failure of the clamp can be tolerated (e.g.: holding wires). Moreover, the excessively large forces that are required to close this clamp on a hose can damage the clamp, which again imposes a limitation to use on light loads. The mode of disengagement described for removal of the Vallinotto et al. clamp leaves ever-present the danger that an accidental impact on one of the branches (2, 3) will open the clamp unintentionally. This danger is aggravated if during installation of the clamp it took a helical form owing to one toothed extension being skewed axially relative to the other. Thus, the Vallinotto et al. clamp requires great care in its installation, as well as continual vigilance during its use to prevent its accidental removal. It is not suitable for use in a mass-production assembly operation.

Bevans U.S. Pat. No. 3,925,851 proposes an improvement in the two-bay hose-clamp configuration of Vallinotto et al. to prevent accidental detachment by a skewing action wherein the band portion of the clamp is wrenched from a ring-form into a helix with separated ends no longer in interfacing relationship. The interengaging teeth (32, 34; called "ratchet teeth") are "hilled" across their width, by forming them as triangular prismoids, the vertex-edges of one set of teeth (32) converging to an interior apex (44) while the vertex-edges of the other set of teeth (34) converge to an exterior apex (40). This pair of interlocking apices is stated to prevent opening the clamp except by a deliberate skewing effort, or by destruction of the clamp, once the clamp has been tightened on the hose which it encircles. Impact against one of the supporting portions (46, 48) is stated to be less likely accidentally to disengage the teeth (32, 34) from each other. Clearly, Bevans' clamp is not intended to be opened and re-used.

The Bevans clamp does not address itself to the problem of increased force required to close a two-bay clamp on a hose requiring a large holding force. In that respect it is identical to the Vallinotto et al. clamp. Bevans is concerned with a solution to the skewing problem, but that solution is difficult to put into practice because the teeth (32) which converge to an interior apex (44) are difficult to make in a molding operation, and Bevans' clamp therefore cannot be provided in large quantities at low prices.

GENERAL NATURE OF THE INVENTION

Encircling devices of the present invention can be clamped around a hose fitted to a tube with force that is increased essentially only on account of reaction of the hose to the clamping force. The encircling band is fitted at its ends with interlocking means having ratchet teeth designed in a configuration which substantially eliminates build-up of tooth-engagement resistance as the clamp is closed, or tightened on a hose. A bay is formed at a first end of the encircling band, and a toothed tongue extension of the second end fits into that bay. The bay is preferably formed of a smooth, non-toothed first extension of the encircling band and, displaced from that extension on a stand-off support, a parallel second extending arm having a short row of ratchet teeth on a limited region of its inner surface, confronting the first extension, and running from its extremity toward the bottom of the bay at the stand-off support, a substantial portion of the inner surface of the arm from the bottom of the bay to the limited region being without ratchet teeth and forming with the first extension a non-friction, non-engagement region with respect to the tongue extension. The arm is made with spring properties such that it is biased toward the first extension, and when the toothed extremity of the spring arm is lifted away from the first extension a restoring force is provided to move it back toward the first extension; the stand-off support is also designed with strength adequate to withstand the restoring force.

The tongue extension of the second end has a row of ratchet teeth on its outer surface (referred to the circular configuration) for engagement with the ratchet teeth in the bay. Preferably this row of outer teeth is longer than the short row of ratchet teeth in the bay, a suitable length for the longer row being that length which will place the extremity of the tongue extension near the bottom of the bay when its teeth furthest removed from its extremity are interlocked with the teeth of the spring arm in the bay.

With this arrangement, the tongue extension can be adjustably located within the bay while engaging only the limited number of ratchet teeth in the spring arm, thereby removing a source of friction heretofore encountered in using plastic hose clamps with ratchet-tooth closures. Once the extremity of the tongue extension has passed by the teeth in the bay it extends freely into the non-friction region, where it is housed but not engaged by any additional ratchet teeth of the bay. Owing to the resilient clamping force available from the spring arm, the teeth in the bay engage fully the teeth of the tongue extension, and this improved feature of the invention makes possible the use of larger teeth than in prior devices, and a smoother more reliable ratchet interengagement action is provided. To open the clamp, it is only necessary to lift the toothed extremity of the spring arm away from the first extension of the bay with a suitable tool, such as a screwdriver, and the tongue extension will be released from the bay. The clamp can be reused; it is not destroyed or damaged when it is opened.

The improved inter-locking mechanism just described removes a source of skewing the interlocking members, by removing the frictional resistance to locking motion as the extremity of the tongue extension proceeds into the lower end of the bay. However, to assure rapid and reliable closure of hose clamps and the like, the invention further provided means at the extremity of the tongue extension for pulling the tongue extension into the bay. Such means may consist in lateral extensions from the extremity providing shoulders that can be grasped on both sides of the extremity. To prevent accidental opening of the clamp, as by a blow against a side of one of the interlocking members, these lateral extensions can extend radially outward (relative to a hose being clamped, for example,) so as to form a channel in which the spring arm will rest when the clamp is closed. Alternatively, other channel members can be provided.

BRIEF DESCRIPTION OF THE DRAWINGS

FIG. 1 is a side view of an encircling device according to the invention;

FIG. 1A is a top view on line 1A—1A of a portion of FIG. 1;

FIGS. 2A and 2B show partial views comparing the closure mechanisms of two encircling devices, FIG. 2A shows a prior art device, and FIG. 2B shows the closure mechanism according to this invention;

FIG. 3 is a side view of another encircling device according to the invention;

FIG. 6 illustrates a tool for closing the device of FIG. 1 into a ring, suitable for clamping a hose on a tube.

DETAILED DESCRIPTION OF THE DRAWINGS

Figure 5:
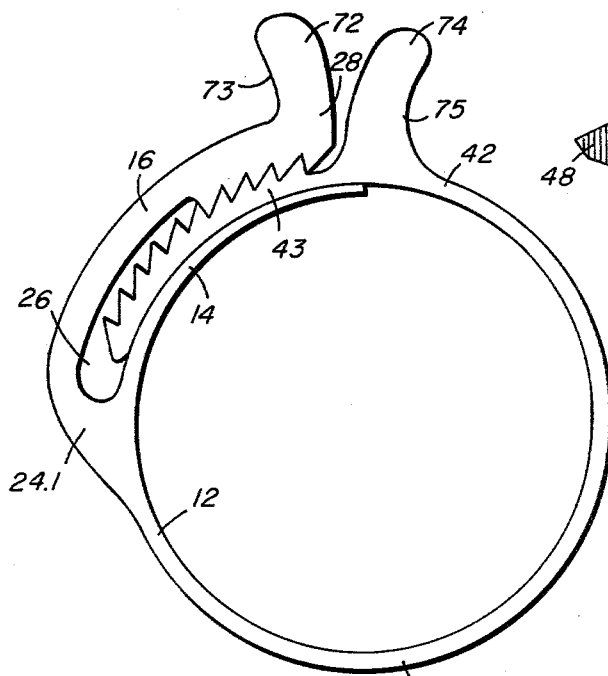
FIG. 5 shows the device of FIG. 3 closed into a ring.

In FIG. 1 an encircling band 10 is fitted at a first end 12 with a first bay extension 14 that is smooth and an arm 16 forming a second bay extension, parallel to the first, which is fitted with saw-tooth shaped ratchet teeth 18 on a part of its surface 20 which faces the first bay extension. The arm 16 is fixed at one end 22 to a stand-off support 24 which in turn is fixed to the first end 12 of the band 10. The bay extensions 14 and 16 form, with the stand-off extension 24, a bay 26, the bottom of which is at the stand-off extension and the mouth of which is at the extremities 28 and 34 of the bay extensions 16 and 14, respectively. The teeth 18 extend along the wall 20 a limited distance from the extremity 28 toward the bottom of the bay 26; in the illustrated example there are only five teeth 18, the remainder of the wall 20 between the short row of teeth and the bottom of the bay 26 being non-toothed, and smooth, so as to leave a region 36 within the bay which is non-toothed. This region comprises a substantial portion of the bay, including the bottom; and it may comprise the major portion of the bay.

The stand-off support 24 and the arm 16 fixed to it are shown more massive than the band 10 and first bay extension 14, to illustrate that while the band and first bay extension are desirably flexible, to enable them to encircle a hose on a tube, the stand-off and the arm are desirably more rigid and possess substantial restoring force. The arm 16 in particular has the properties of a stiff spring, such that if it is forced at its extremity 28 to move away from the first bay extension 14, upon being released it will return toward the first bay extension, as is represented by an arrow 40. The second end 42 of the band 10 has a tongue extension 43 which is fitted on its outer surface 44 (as seen in FIG. 1) with a second row of saw-tooth shaped ratchet teeth 46 oriented for interlocking engagement with the teeth 18 when the tongue extension 43 is inserted into the bay 26. The second row of teeth 46 is preferably longer than the short row of teeth 18 in the bay; eight (8) teeth 46 are shown, as compared with five (5) teeth 18. The second row of teeth 46 extends from the extremity 48 of the tongue extension 43 back to the second end 42 of the band 10. The tongue extension 43 is preferably stiffer than the band 10 is required to be.

Referring now to FIG. 2, firstly to FIG. 2B, some novel features of the locking mechanism of the invention will now be apparent. In FIG. 2B the tongue extension 43 is shown inserted fully into the bay 26. In this figure, there are four (4) teeth 18 on the spring arm 16, and ten (10) teeth 46 on the tongue extension 43, five (5) of which teeth 46 are within the non-toothed region 36 of the bay 26 where they are merely enclosed within the non-toothed region 36 of the bay 26, but not in physical contact with any interlocking mechanism nor with the inner wall 20 of the spring arm 16. Only four of the longer row of teeth 46 are interlocked with the shorter row of teeth 18 in the outer portion of the bay 26. Only the ramp faces 18.1 of these four teeth can become involved in sliding on the corresponding ramp faces 46.1 of the teeth 46 when the tongue extension 43 is inserted into the bay 26. Thus, the sliding friction which is available to oppose movement of the tongue extension 43 into the bay 26 is limited to the sliding friction of the ramp faces 18.1 and 46.1 of four ratchet teeth of each row. Once the first four teeth 46 of the tongue extension 43 have engaged with the teeth 18 in the bay, the sliding friction will have reached its maximum, and will not increase when the tongue extension is moved further into the bay.

A clearance space is provided in the non-toothed region 36, between the apices 46.2 of the teeth 46 on the tongue extension 43 and the inner wall 20 of the spring arm 16. This has several advantages. As has been mentioned, it assures that there will be no friction between the tongue extension 43 and the spring arm 16 within the non-toothed region 36. It assures also that the spring arm can be flexed without interference toward and away from the first bay extension 14 as the tongue extension is being inserted into the bay 26 and the ramp faces 18.1 and 46.1 are sliding one on the other. Further it allows the designer a wider range of choice in the size of the ratchet teeth, which in turn enhances the opportunity to limit the number of teeth required to lock the device with a given required clamping force. And, it makes possible the disengagement of bay teeth 18 from tongue teeth 46 by lifting the spring arm 16, at its extremity 28, which can be done with a simple tool such as a screwdriver.

FIG. 2A will facilitate comparison of the invention, as thus far described, with certain features of the prior art practice. In FIG. 2A reference characters primed have been included to denote parts that correspond in FIGS. 2(A) and 2(B). The tongue extension 48' and the arm 16' have equal numbers of teeth 18' and 46'. It will be apparent that as the tongue extension 43' is inserted into the bay 26', the number of inter-engaging teeth will proportionally increase, and in consequence the sliding friction of teeth-on-teeth will increase at least proportionally. While the region of the arm 16' near its extremity 28' can move away from the first bay extension 14' a distance large enough to admit one tooth 46' after another into the bay 26', the arm 16' will be stiffer nearer to its root, so that the region of the arm 16' nearer to the bottom of the bay 26' is less able to move outwardly, and the sliding friction of opposing teeth will be greater in this region owing to the greater resistance of the arm 16' to being deflected (i.e.; the restoring force of a short spring is greater than the restoring force of a longer spring of the same structure and material). Thus, the sliding friction increases by a factor in excess of proportional to the number of teeth engaged, as the tongue extension 43' is moved into the bay 26'.

If it be attempted to release the closure shown in FIG. 2A by lifting the extremity 28' of the arm 16' away from the first bay extension 14', the teeth 18' and 46' near the bottom of the bay 26' will not disengage. It is for this reason that prior art plastic hose clamps have been opened only by skewing one of the interlocked members sideways relative to the other. The present invention is not so constrained, and for that reason provided additional advantages which will presently be described.

Referring now to FIGS. 1 and 1A, the tongue extension 43 is fitted near its extremity 48 with lateral extensions 52, 54 providing shoulders 53, 55, respectively, at which the tongue extension may be grasped and pulled into the bay 26. Conceptually, this can be done manually by placing the thumb of (e.g.:) the left hand behind the heel of the standoff extension 24 and engaging the index finger and the middle finger on the shoulders 53, 55, respectively. A pliers-like tool 60 for doing it effectively in a mass-production operation is shown in FIG. 6, where one pivotal member 62 has an end 64 fitted with an engagement finger 65 corresponding to the thumb, and the other pivotal member 66 has a bifurcated end 68 with two engagement fingers 68.1 and 68.2 corresponding, respectively, to the index and middle fingers in the conceptual example. With this tool, a person can install a clamp according to FIG. 1 on a hose-and-tube assembly quickly and reliably, with required clamping force, and without skewing the tongue 43 in the bay 26. As will be apparent, ramp surfaces 18.1 will ride up on ramp surfaces 46.1 as the tongue enters the bay, against the spring action of the arm 16, and the respective teeth 18 and 46 will interlock under the spring action of the arm.

Figure 4:
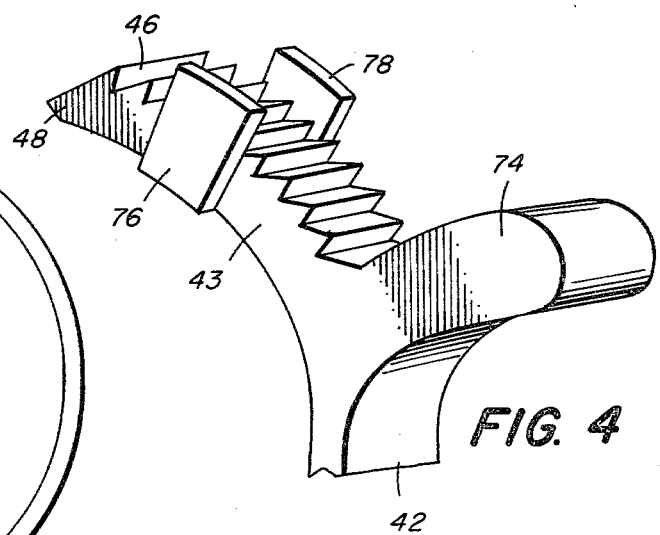
FIG. 4 is an isometric view on an enlarged scale of a part of FIG. 3.

FIGS. 3, 4 and 5 illustrate a second embodiment of the invention, in which parts that are similar to parts in FIG. 1 have the same reference characters. Radially—extending closure pads 72, 74 are provided at the extremity 28 of the spring arm 16, at the root of the tongue extension 43, respectively. These closure pads are curved to provide concave shoulders 73, 75, respectively, which can be grasped manually, or with pliers, for pulling one toward the other. The stand-off support 24.1 can be rounded at its outer surface, since that surface is not used in this embodiment for closing the clamp. Channel-guides 76, 78 are fitted at opposite sides, respectively, of the tongue extension 43, near its extremity 48, for guiding the tongue extension 43 into the bay 26 when the clamp is closed by pulling one of the closure pads 72 or 74 toward the other. In the illustrated embodiment, the channel-guides provide a channel in which the spring arm 16 is guided relative to the tongue extension 43. The channel guide could be put on the spring arm, near the extremity 28, and extending radially inward to provide a channel for the tongue extension 43. Alternatively, or additionally, channel guides could be fitted to the first bay extension 14. The embodiment illustrated is preferred because it guides the spring arm at a region near the extremity 48 of the tongue extension 43, thereby giving greater assurance that the extremity 48 will not be skewed out of the bay 26. It will be apparent that the lateral extensions 52, 54 in FIG. 1 could be extended radially outward to include the function of the channel guides 76, 78, respectively, if desired.

The clamp of FIGS. 3–5 can be opened in the same manner as the clamp of FIG. 1. A screwdriver or similar tool can be placed between the closure pads 72, 74 of the closed clamp (FIG. 5), and there used to lift the spring arm extremity 28 off the teeth 46 of the tongue extension 43.

Figure 7:
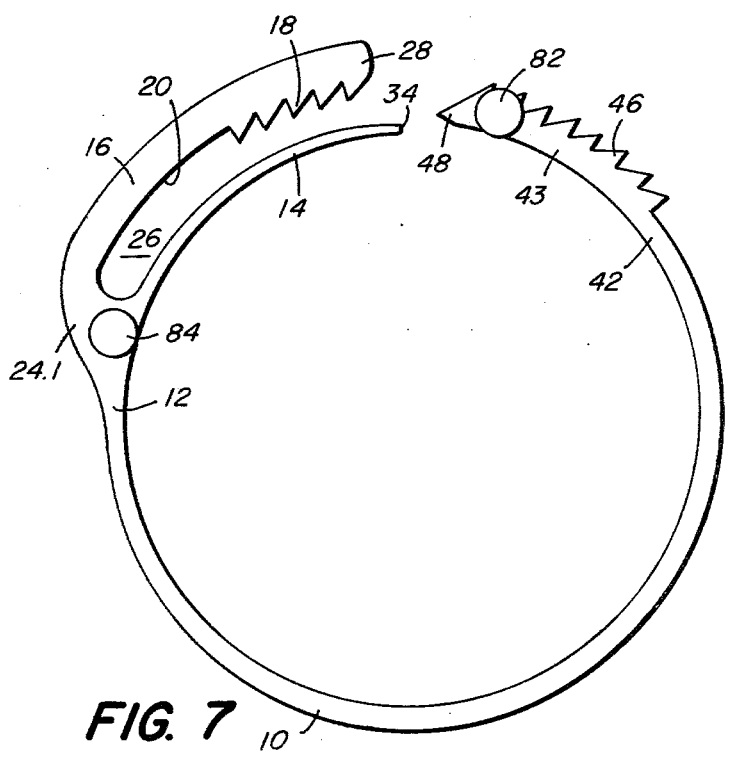
FIG. 7 illustrates another encircling device according to the invention.
Figure 9:
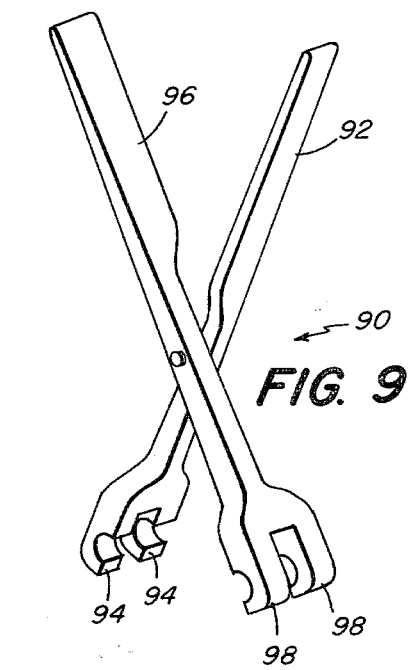
FIG. 9 illustrates a tool for closing the device of FIG. 7.
Figure 8:
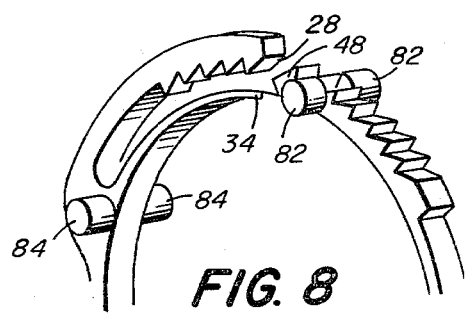
FIG. 8 is an isometric view of the device shown in FIG. 7.

FIGS. 7 and 8 illustrate a third embodiment of the invention, in which parts that are similar to parts in FIG. 1 or FIG. 3 have the same reference characters. Lateral extensions 82, 82 are provided, corresponding to extensions 52, 54 in FIG. 1, near the extremity 48 of the tongue extension 43, at which the tongue extension may be grasped and pulled into the bay 26. Corresponding extensions 84, 84 are provided at the stand-off extension 24.1. A tool 90 shown in FIG. 9, has pairs of fingers 94, 94 and 98, 98 on arms 92, 96, respectively, for grasping the respective pairs of lateral extensions, and closing the encircling device. The clamp of FIGS. 7 and 8 can be opened in the same manner as the clamp of FIG. 1.

I claim:

1. An encircling device for clamping a hose or the like comprising a flexible elongated body having first and second ends which interlock adjustably to close the device, the first end having a bay formed of two arms extending a first distance substantially parallel to each other from that end, one arm located radially outward of the other when the device is closed having tooth means oriented radially inward toward the other arm and extending from the extremity of said one arm back toward said first end a limited distance which is substantially less than said first distance, the remainder of said one arm being without tooth means and substantially smooth providing a region in said bay for freely receiving said second end, means resiliently urging said one arm with said tooth means toward the other arm of said bay, the second end having substantially exclusively a tongue fitted with tooth means oriented radially outwardly when the device is closed and extending along one side of said tongue a third distance longer than said limited distance for adjustably interlocking with all of the teeth in said bay.

2. An encircling device according to claim 1 including means to pull said tongue into said bay.

3. An encircling device according to claim 2 wherein said means to pull said tongue are located substantially at the extremity of said tongue.

4. An encircling device according to claim 3 including pulling members extending laterally from said tongue for enabling said tongue to be grasped at both sides at said extremity and pulled into said bay.

5. An encircling device according to claim 1 including means to guide said tongue into said bay.

6. An encircling device according to claim 5 including means forming a channel for guiding said tongue into said bay.

7. An encircling device according to claim 6 wherein said channel is formed on said tongue and embraces said one arm with tooth means when said tongue is inserted into said bay.

8. An encircling device according to claim 7 including means to pull said tongue into said bay, comprising shoulder means provided by said means forming said channel.

9. An encircling device according to claim 4 including additional pulling members extending laterally from substantially said first end for enabling said device to be pulled at said end toward said extremity of said tongue.

10. In an encircling device having a flexible elongated body fitted at its first and second ends with respective first and second interlocking means for closing the device around an article or articles to be encircled, the improvement wherein the first interlocking means comprises first and second arms extending substantially parallel to each other from said first end to form a bay having an opening between extremities of said arms remote from said first end, the second arm being a spring for developing a restoring force if its extremity is moved away from the first arm so as to widen said opening, the second arm having on a surface confronting the second arm a first row of interlocking elements extending only part way into the bay from said extremity leaving an inner region of said bay free of interlocking elements, and the second interlocking means comprising a tongue extending from said second end and having along one side a second row of interlocking elements running from the extremity of said tongue toward said second end for engaging with the interlocking elements of said first row when said tongue is moved into said bay through said opening, said second row being substantially longer than said first row so that interlocking elements of said second row nearer to said extremity of said tongue will be in said inner region when interlocking elements of said second row nearer to said second end are engaged with interlocking elements of said first row, said second arm being disposed outward of said first arm when said device is closed, whereby said device when closed can be opened by moving the extremity of said second arm further outward to widen said opening and disengage all the interlocking elements of said first row from the interlocking elements of said second row.

11. An encircling device according to claim 10 including first and second closure pads extending outwardly from the extremity of said second arm and from the region of juncture of said tongue and said second end, respectively.

12. An encircling device according to claim 10 including means to pull said tongue into said bay.

13. An encircling device according to claim 10 including means to guide said tongue into said bay.

14. An encircling device according to claim 12 including means substantially at said first end of said elongated body providing a reference toward which to pull said tongue into said bay.

* * * * *